March 22, 1966
R. B. MOTT ETAL
3,241,711
DISPENSING APPARATUS
Filed May 27, 1964
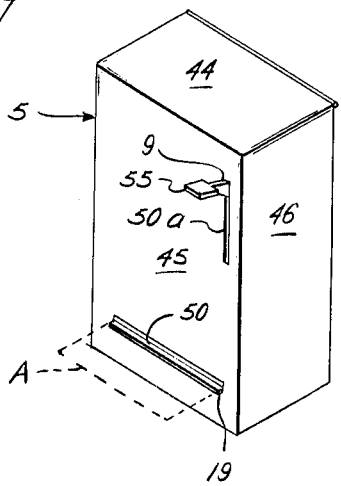
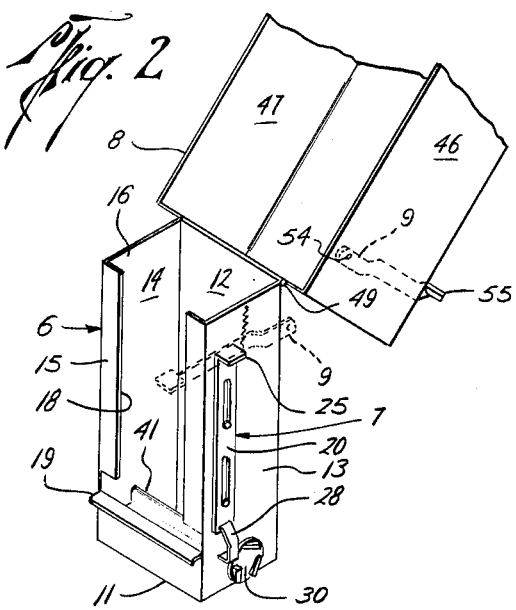
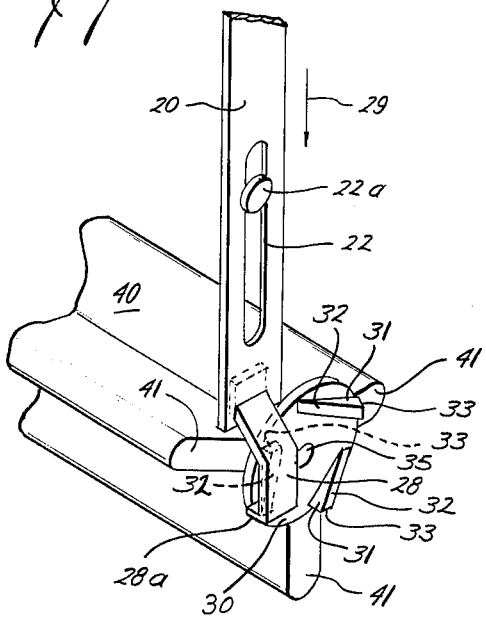
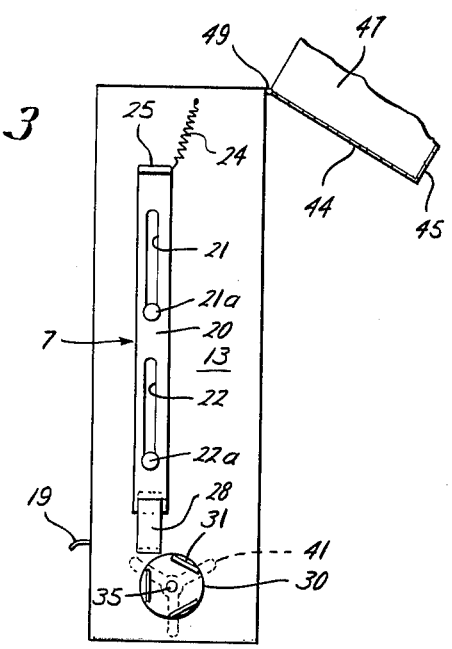
Ralph Beach Mott,
Ralph Beach Mott, Jr.
INVENTORS
BY Hayden & Pravel
ATTORNEYS

United States Patent Office 3,241,711
Patented Mar. 22, 1966

3,241,711
DISPENSING APPARATUS
Ralph Beach Mott and Ralph Beach Mott, Jr.,
both of 602 Sul Ross, Houston, Tex.
Filed May 27, 1964, Ser. No. 370,479
4 Claims. (Cl. 221—259)

This invention relates to new and useful improvements in apparatus for storing and dispensing credit sales tickets of the type used in recording retail credit sales in service stations.

Although there are some variations in the type of tickets or sales forms used by different service stations for recording retail credit purchases, generally, such records are made on a multi-sheet business form which includes a punch card form, which the service station company processes in its electronic billing and accounting machines, and a duplicate tissue or paper form for the customer's records, together with a disposable carbon disposed between the punch card form and the duplicate tissue sheet. Service station credit cards having the customer's name and identifying number embossed thereon together with other information which is sometimes in code, are provided by various oil companies to facilitate recording credit sales made in their service stations. Such cards are normally used for printing the embossed information thereon on the multi-sheet credit sale tickets or forms. Thus, when a credit sale is made, the service station attendant prints the credit card information on the multi-sheet business form with a special imprinter and manually inscribes other pertinent information regarding the sale on the credit sale ticket on slip. As this is generally the only record made of the transaction initially, it is important that pertinent details be recorded accurately thereon; however, due to the fact that the credit tickets or business forms are used in a service station where they are exposed to the weather and to dirt and grease normally associated with automobiles and other motor vehicles, and that the service station attendants who handle the forms quite frequently have soiled hands from working on such vehicles, it is difficult to prevent dirt or grease from smudging or marking the credit tickets or punch cards and other parts of the form. These cards or tickets are normally read very rapidly in preparing them for the electronic accounting machines in which they are processed, in some instances at the rate of several thousand cards per hour. Therefore, it is imperative that such cards be free of obscuring or confusing marks or smudges which are likely to result in the recordation of erroneous information. Grease and other foreign matter may either make an improper mark on the initial business record or credit ticket or, in some instances, may prevent an intended mark from being properly recorded on the business form.

Another difficulty with the multi-sheet business forms that are presently available is that they are quite frequently used for scratch paper or note paper or are lost, so that a very large percentage of the supply of such forms is almost invariably wasted.

Therefore, an object of the present invention is to provide a new and improved business form or credit sale ticket dispenser to protect such forms from the weather and from soiling agents frequently found with service station driveways.

Another object of the present invention is to provide a new and improved ticket dispenser which will selectively dispense one ticket at a time.

Yet another object of the present invention is to provide a new and improved ticket dispenser having a window therein and an actuating mechanism for ejecting one of such tickets at a time through the window edgeways upon actuation of the mechanism to present the edge of such ticket for manual gripping by the service station attendant.

And yet another object of the present invention is to provide a new and improved dispensing mechanism for dispensing tickets wherein a minimum surface area of the ticket is presented for touching when the card is dispensed.

Another object of the present invention is to provide a new and improved credit sale ticket dispensing apparatus having an actuating bar slidably mounted thereon for rotating a one-way ratchet drive which is connected to a rotatable transport means for ejecting one ticket each time the actuating bar is operated.

Other objects and advantages of the present invention will become more readily apparent from a consideration of the following description and drawings, wherein:

FIG. 1 is an isometric view showing the apparatus of the present invention with its cover in the closed position with a card, shown in dotted outline, projecting therefrom;

FIG. 2 is an isometric view showing the present invention with its case or cover in an open position and with the lever arm portion of the operating mechanism shown in phantom in the position which it normally occupies when the case is closed;

FIG. 3 is an enlarged side elevation showing details of construction of the operating mechanism; and FIG. 4 is an enlarged fragmentary isometric view showing details of the construction of the ratchet and the transport means of this invention.

In the drawings, the ticket dispensing apparatus of the present invention is designated generally by the numeral 5. Briefly, the apparatus 5 comprises an inner support housing 6 which is provided for receiving and storing a stack or supply of multi-sheet business forms, such as described above, and which also carries an operating mechanism designated generally 7 which is provided for transporting one of such tickets or forms A from its storage position to a position (shown in dotted outline in FIG. 1) where at least one of its edges projects beyond the apparatus 5, as will be described more fully herein. The apparatus 5 also includes a case or cover 8 which telescopically fits over the inner support housing 6 and which carries a lever arm 9 that is provided to facilitate manually actuating the operating mechanism 7. As will be explained more fully hereinafter, each time the actuating lever 9 is operated, one of the punch card forms is ejected edgewise from the case 8, thereby presenting an edge of the form for manual gripping by an attendant. Thereafter, the credit slip is inserted into an imprinter in which an embossed credit card is used to print or record the customer's name and identifying number for a particular credit sale. With the apparatus 5 of this invention the tickets or business forms are protected from the weather and other soiling agents and may be handled with a minimum of manual contact with the surfaces on which the pertinent sales information is recorded. Also, having the business forms or sales tickets stored in a closed receptacle will largely negate their loss and wasteful use.

Considering now the apparatus 5 in more detail, as best seen in FIG. 2 of the drawings, the inner support housing 6 includes a bottom member 11, a back member 12, a pair of substantially parallel side members 13 and 14, respectively, a partially open front or face 15 and an open top 16. It can be appreciated that the support housing 6 may be formed integrally or, the various members comprising the support housing 6 may be formed separately and joined together in a suitable manner, as desired. The face or front member 15 has an inverted T-shaped slot 18 cut or formed therein with a lip or laterally projecting flange 19 provided at the lower edge of such inverted T-shaped slot for guiding and supporting the cards or forms as they are ejected from such housing 6, as will be explained in detail hereinafter.

The slot 18 also provides easy or ready access to the interior of the support housing 6 for quickly and easily stacking or depositing a supply of forms or tickets therein and also to enable the attendant to determine quickly the precise quantity of forms stored therein.

As best seen in FIG. 3 of the drawings, the operating mechanism 7 comprises a longitudinally extending bar 20 which, as shown, has a pair of longitudinally extending slots 21 and 22 formed therein for receiving a pair of pins 21a and 22a, respectively, which are provided for slidably mounting the bar 20 on the outside of the side 13 of the support housing 6. While the pin and slot arrangement is shown for mounting the bar 20 on the inner support housing 6, it can be appreciated that other arrangements may be provided for slidably mounting and guiding the bar 20 relative to the housing 6 without departing from the scope of this invention.

The pins 21a and 22a, respectively, are constructed and arranged so that the bar 20 is allowed to move longitudinally relative to such pins 21a and 22a, and also to move laterally relative thereto in the course of its longitudinal movement for a purpose to be described more fully hereinafter.

A spring 24 or other resilient member is provided for constantly urging the longitudinally extending bar 20 to move upwardly to thereby return the bar to its uppermost position relative to the pins 21a and 22a as shown in FIG. 3 when a depressing force is not being applied thereto as will be explained.

As shown in FIGS. 2 and 3, the bar 20 has a laterally extending flange or shoulder 25 provided at the uppermost end thereof for a purpose to be described hereinafter. Also, the spring 24 is shown having one end connected to the side member 13 and the other end connected to the bar 20 to urge such bar longitudinally upwardly relative thereto.

A pawl 28 is secured to the lower end of a bar 20 and is provided for rotating a ratchet wheel 30 which is rotatably mounted on the support housing 6. As seen in FIG. 4, the pawl 28 is bent or deflected laterally relative to the ratchet wheel 30 and has a laterally extending shoulder or projection 28a formed at the lower end thereof for a purpose to be described herein.

The ratchet wheel 30 which is disposed outside of the support housing 6 is secured to a rod 35 which is rotatably mounted in the support housing 6. As shown, the rod or shaft 35 also has transport means 40 secured thereon and disposed in the housing 6 so that as the ratchet 30 is rotated, such transport 40 is also rotated therewith, as will be described more fully herein.

As best seen in FIGS. 3 and 4 of the drawings, the ratchet wheel 30 has three laterally facing wedges or ratchet drive blocks 31 disposed circumferentially thereof at substantially equally spaced intervals and secured thereto by welding or other suitable securing means. Each of the wedges 31 has an inclined face 32 that is tapered laterally outwardly from the side of the ratchet wheel 30 on which it is mounted and a shoulder portion 33 that is substantially perpendicular to the side of the ratchet wheel 30. The ratchet drive blocks 31 are arranged on the ratchet wheel 30 with the inclined surfaces 32 facing in a counterclockwise direction and with the shoulder portions 33 each facing in a clockwise direction of rotation.

As viewed in the drawings (FIGS. 3 and 4) the pawl 28 is disposed on the left side or front side of the ratchet wheel shaft 35 so that when such pawl 28 is moved longitudinally downwardly in the direction indicated by the arrow 29 (FIG. 4) such pawl 28 will engage the shoulder portion 33 of the ratchet block disposed therebelow to advance the ratchet wheel 30 and rotate the transport mechanism 40 connected thereto in a counterclockwise direction. Thereafter, when the pawl 28 moves upwardly its lower prong or projection 28a will engage the inclined surface 32 of the following ratchet block 31 and thereafter will move outwardly as it moves upwardly until such pawl 28 passes above the shoulder portion 32 whereupon the pawl 28 will spring back to a position above the following block 31 so as to further advance the ratchet wheel 30 when the pawl 28 is next moved longitudinally downwardly.

The transport means comprises a longitudinally extending block or body 40 which extends longitudinally of the shaft 35 and which is connected to such shaft for rotation therewith. As shown, the body 40 comprises three longitudinally extending and radially projecting arms 41 which are spaced at substantially equivalent intervals circumferentially of the shaft 35. Each of the arms or projections 41 extends substantially the full width of the inner support housing 6 for engaging and transporting the forms or cards stacked therein. Normally, such cards would be stacked one on top of another in a substantially vertical stack in the support housing 6 so that one of the radially extending arms 41 will engage the lower surface of the lowermost or bottom card A to transport it laterally when the operating mechanism 7 is actuated to rotate the body 40.

As shown in FIGS. 1 and 2 of the drawings, the case or cover 8, which is adapted to fit telescopically over the inner support housing 6, comprises a top 44, a face or front 45, and a pair of side members 46 and 47, respectively. Such case may be formed integrally or its parts may be connected together by suitable connecting means, as desired. The rear edge of the top member 44 is normally connected to the upper edge of the back member 12 by means of a pivot pin 49 to pivotally mount such cover or case on the support housing 6. As shown, the face or front 45 of the case 8 has a window or aperture 50 through which the sale tickets or forms are dispensed when the operating mechanism 7 is actuated. Such window or aperture 50 is positioned adjacent the lower portion of the inverted T-slot 18 so that the lip or laterally extending flange 19 protrudes through the lower portion of the window 50, whereby the window 50 and the lip 19 cooperate to form a guideway for supporting and receiving the card A until it is manually removed by the attendant.

The lever arm 9 is provided for manually actuating the operating mechanism 7. As seen in FIG. 2 of the drawings, the lever arm 9 is pivotally mounted on the side 46 of the case 8 by means of a pivot pin 54 with one end of the lever arm 9 projecting through a window 50a in the face 45. The outer end of the lever arm 9 has a handle or tab 55 secured thereto to facilitate manual actuation of such lever arm.

As shown in phantom in FIG. 2, when the case 8 is pivoted to its closed position relative to the support housing 6, the lever arm 9 is aligned with the lateral shoulder 25 of the bar 20 so that when the lever arm 9 is depressed or pivoted downwardly it will engage the shoulder 25 to thereby depress the bar 20 and move it longitudinally downwardly.

When in use, the apparatus 5 of this invention may be supported on a stand or may be secured to a wall by suitable support or mounting brackets of a type well known in the art. With the case 8 in the open position (FIG. 2) a supply or stack of cards or forms may be inserted through the open top 16 of the inner support housing 6 and positioned therein so that the lowermost cards in the stack are adjacent the lip or flange 19 and the lower portion of the inverted T-shaped slip 18. Thereafter, the case may be pivoted downwardly to the closed position (FIG. 1) with the window or aperture 50 aligned with the inverted T-shaped slot 18 so that the lip 19 protrudes through such window 50 and with the actuating lever 9 aligned to engage the flange or shoulder portion 25 of the bar 20. When the actuating lever 9 is depressed it engages the shoulder 25 to also depress or move the bar 20 longitudinally downward relative to the side 13 on which it is mounted by support pins 21a and 22a, respectively.

As the rod 20 moves longitudinally downwardly in the direction of the arrow 29 (FIG. 4), the pawl 28, secured to the lower end thereof, engages the clockwise facing shoulder portion 33 of the ratchet wheel drive block 31 which is positioned below such pawl 28 for engagement thereby (FIG. 3). After the shoulder portion 33 has been engaged by the lower end of the pawl 28, continued downward movement of the bar 20 and the pawl 28 will rotate the ratchet wheel and the transport body 40 counterclockwise. As the transport body 40 is rotated counterclockwise the arm or longitudinal projection 41 which is positioned below and to the rear of the stack of cards or business forms in the inner support housing 6 will be rotated upwardly and forwardly to frictionally engage and transport the lowermost card or form laterally edgeways through the window or aperture 50 onto the lip 19. It can be appreciated that when three of such ratchet drive blocks 31 are spaced at substantially equivalent intervals around the circumference of the ratchet wheel 30, such ratchet wheel will be caused to rotate approximately one third of a revolution or one hundred and twenty degrees upon each downward stroke of the pawl 28. Thus, as such pawl is moved downwardly, it moves the drive block following the drive block 31 with which it is engaged, into position for engagement by the pawl 28 on its succeeding downward stroke. After such pawl 28 has completed its downward stroke, it begins its upward stroke with the following block 31 positioned laterally adjacent thereto as shown in FIG. 4. On its upward stroke, the lower shoulder 28a engages the inclined surface 32 which causes the pawl 28 to move laterally outwardly as it moves longitudinally upwardly so as to pass about the shoulder 33, whereupon such pawl 28 is moved laterally inwardly relative to the ratchet wheel 30 by the spring 24 to a position for engaging the shoulder 33 upon the next downward stroke of such pawl 28.

It can be appreciated that with the embodiment of the present invention shown, each time the actuating bar 20 is depressed the transport body 40 will be rotated approximately 120 degrees to transport the lowermost ticket or form laterally to the window or aperture 50. Also, while three longitudinal arms 41 are shown on the transport body 40, and three ratchet drive blocks 31 are shown on the ratchet wheel 30, it can be appreciated that the number of frictional engaging arms 41 or drive blocks 31 may be varied without departing from the scope of the present invention.

Broadly, the card dispensing apparatus of the present invention provides an apparatus for storing a supply of card forms in a closed receptacle and selectively dispensing such card forms one at a time as desired.

What is claimed is:

1. An apparatus for dispensing card forms including:
  (a) a storage housing having an upper opening for stacking cards therein and a lower opening for dispensing cards edgeways therethrough;
  (b) cover means pivotally mounted on said storage housing and adapted to telescopically fit over such storage housing, said cover means having a lower opening therein aligned with the lower opening in said storage housing for dispensing cards therethrough;
  (c) card ejecting means rotatably mounted in said storage housing below said lower opening for ejecting cards edgeways therethrough;
  (d) ratchet means connected to said transport means for rotating same in one direction only;
  (e) bar means slidably mounted on said support housing;
  (f) pawl means on the lower end of said bar means for engaging said ratchet means to rotate said card ejecting means when said bar is moved longitudinally downwardly; and
  (g) lever means pivotally mounted in said case and adapted to engage the upper end of said bar means for moving said bar means longitudinally downwardly when said lever is depressed.

2. Apparatus for dispensing card forms including:
  (a) a storage housing having an upper opening for stacking cards therein and a lower opening for dispensing card edgeways therefrom;
  (b) cover means pivotally mounted on said storage housing and adapted to be opened for stacking cards in said support housing, said cover having an opening therein aligned with the lower opening of said support housing when said cover is closed to enable cards to be passed edgeways therethrough;
  (c) a longitudinal body rotatably mounted in said storage housing adjacent said lower opening for transporting cards laterally therethrough;
  (d) said body having a plurality of radially projecting longitudinally extending circumferentially spaced members for frictionally engaging the cards stacked in said support housing to move the frictionally engaged cards laterally upon the rotation of said body;
  (e) ratchet drive means connected to said rotatably mounted body for rotating such body; and
  (f) means for actuating said ratchet drive means.

3. Apparatus for dispensing card forms including:
  (a) a storage housing having an upper opening for stacking cards therein and a lower opening for dispensing cards edgeways therefrom;
  (b) cover means pivotally mounted on said storage housing and adapted to be opened for stacking cards in said support housing, said cover having an opening therein aligned with the lower opening of said support housing when said cover is closed to enable cards to be passed edgeways therethrough;
  (c) a longitudinal body rotatably mounted in said storage housing adjacent said lower opening for transporting cards laterally therethrough;
  (d) said body having a plurality of radially projecting longitudinally extending circumferentially spaced members for frictionally engaging the cards stacked in said support housing to move the frictionally engaged cards laterally upon the rotation of said body;
  (e) ratchet drive means connected to said rotatably mounted body for rotating such body;
  (f) bar means slidably mounted on said support housing;
  (g) pawl means on the lower end of said bar means for engaging said ratchet means to rotate said body when said bar is moved longitudinally downwardly; and
  (h) lever means pivotally mounted in said case and adapted to engage the upper end of said bar means for moving said bar longitudinally downwardly when said lever is depressed.

4. An apparatus for dispensing card forms including:
  (a) a storage housing having an upper opening for stacking cards therein and a lower opening for dispensing cards edgeways therethrough;
  (b) cover means pivotally mounted on said storage housing and adapted to telescopically fit over such storage housing, said cover means having a lower opening therein aligned with the lower opening in said storage housing for dispensing cards edgeways therethrough;
  (c) card ejecting means rotatably mounted in said storage housing below said lower opening for ejecting cards edgeways therethrough;
  (d) ratchet drive means connected to said card ejecting means for rotating same, said ratchet means including a ratchet wheel having a plurality of circumferentially spaced laterally extending projections;
(e) pawl means for engaging said projections to rotate said ratchet wheel and the card ejecting means connected thereto when said pawl is moved in one direction relative to said projections;
(f) inclined surfaces on the rear side of each of said projections for urging said pawl means laterally outwardly to cause said pawl means to pass over the following projection when said pawl means is moved in an opposite direction from said one direction; and
(g) bar means connected to said pawl means and adapted to be moved manually in said one direction to cause said pawl means to engage one of said projections and adapted to be moved manually in said opposite direction to cause said pawl means to engage said paterally inclined surface and pass over said following projection for positioning said pawl means relative to said following projection.

References Cited by the Examiner
UNITED STATES PATENTS

| | | | |
|---|---|---|---|
| 771,265 | 10/1904 | Patton | 221—266 |
| 1,239,663 | 9/1917 | Bartlett et al. | 221—259 |
| 1,744,854 | 1/1930 | Zinna | 221—286 |
| 2,200,842 | 5/1940 | Gray | 221—259 |
| 2,265,748 | 12/1941 | Slezak | 221—259 |
| 2,876,007 | 3/1959 | Patrick | 221—268 |

LOUIS J. DEMBO, *Primary Examiner.*

WALTER SOBIN, *Examiner.*